(12) United States Patent
Yendluri

(10) Patent No.: US 8,005,967 B2
(45) Date of Patent: Aug. 23, 2011

(54) POLICY NEGOTIATION SYSTEM AND METHOD

(75) Inventor: Prasad Yendluri, San Jose, CA (US)

(73) Assignee: Software AG, Inc., Darmstadt (DE)

( * ) Notice: Subject to any disclaimer, the term of this patent is extended or adjusted under 35 U.S.C. 154(b) by 494 days.

(21) Appl. No.: 12/073,647

(22) Filed: Mar. 7, 2008

(65) Prior Publication Data

US 2009/0228595 A1 Sep. 10, 2009

(51) Int. Cl.
*G06F 15/16* (2006.01)
(52) U.S. Cl. ........ 709/228; 709/203; 709/232; 709/237; 726/6; 726/7
(58) Field of Classification Search .................. 709/203, 709/223, 228, 232, 237, 217; 726/1, 6, 7
See application file for complete search history.

(56) References Cited

U.S. PATENT DOCUMENTS

| 7,664,828 B2* | 2/2010 | Schlimmer et al. ........... 709/217 |
|---|---|---|
| 2005/0188072 A1* | 8/2005 | Lee et al. ...................... 709/223 |
| 2006/0075465 A1* | 4/2006 | Ramanathan et al. ............ 726/1 |
| 2006/0075466 A1* | 4/2006 | Ramanathan et al. ............ 726/1 |
| 2007/0226356 A1* | 9/2007 | Levin et al. ................... 709/227 |
| 2008/0046335 A1* | 2/2008 | Zhou ............................... 705/26 |
| 2008/0228860 A1* | 9/2008 | Angelov ...................... 709/202 |
| 2008/0244692 A1* | 10/2008 | Chang ............................. 726/1 |
| 2008/0244693 A1* | 10/2008 | Chang ............................. 726/1 |
| 2008/0301755 A1* | 12/2008 | Sinha et al. ...................... 726/1 |
| 2009/0150969 A1* | 6/2009 | Davis et al. ..................... 726/1 |

* cited by examiner

*Primary Examiner* — Oanh Duong
(74) *Attorney, Agent, or Firm* — Venable LLP; Jeffri A. Kaminski

(57) ABSTRACT

A system and method for policy negotiation in a web services platform includes a client node and a provider server that transmits policy alternatives to the client node. The client node selects at least one policy from the policy alternatives and transmit the selected policy to the provider server. The provider server verifies the client's policy selection based on the policy alternatives and communicates over a network with the node based on the selected policy.

16 Claims, 5 Drawing Sheets

POLICY NEGOTIATION SYSTEM AND METHOD

CROSS-REFERENCE TO RELATED APPLICATION

The present application is related to U.S. patent application entitled "Distributed Business Processing Tracking", Ser. No. 12/073,642, and patent application entitled "System, Method and Computer Program Product for Generating Bulk Event Transfer", Ser. No. 12/073,662, both filed concurrently herewith and having a common inventor as the present application, the contents of both of which are incorporated herein by reference in their entirety.

BACKGROUND OF THE INVENTION

1. Field of Invention

The present invention relates generally to a network communication system and more particularly to the policy framework within a network communication system.

2. Background of the Related Art

A Web Service (WS) system is a software system designed to support interoperable machine-to-machine interaction over a network. Web Services are frequently web Application Platform Interfaces (API) that can be accessed over a network, such as the Internet, and executed on a remote system hosting the requested services. The World Wide Web Consortium (W3C) definition of Web Service encompasses many different systems, but in common usage the term refers to clients and servers that communicate using XML messages that follow the Simple Object Access Protocol ("SOAP") standard.

The Web Services Policy Framework ("WS-Policy") is a specification that provides a flexible and extensible grammar for various entities in a web services-based system to express and advertise their policies, which include, but are not limited to, system capabilities, requirements, quality of service, security requirement, encryption support, and other general characteristics. WS-Policy defines a framework and a model for the expression of these properties as policies.

In a provider-client type environment, the WS-Policy typically involves the provider making a "policy assertion" including a policy that is a requirement. According to the WS-Policy Framework Specification, Version 1.5 (September 2007), available at http://www.w3.org/2002/ws/policy, the assertions are typed by the domain authors that define them and indicate domain-specific (e.g., security, transactions) semantics. A "policy alternative" is a logical construct which represents a collection of policy assertions. A service provider policy typically contains several choices asserted in the policy alternative, which a consumer of the service has a choice to pick from. For example, a message privacy policy could offer a variety of encryption algorithms for the client to choose from. Once the client picks a policy assertion from the policy alternative, all interactions between the client and the provider must conform to that particular policy.

A difficulty with the current WS-Policy framework, however, is that once the client chooses a policy from among the policy alternatives, there is no way for the client to indicate directly to the provider which policy alternative it has chosen. Thus, the provider can only rely on the incoming messages to implicitly determine the policy alternative picked by the client based on the protocol elements present in the incoming messages. This lack of sufficient communication between the provider and the client becomes troublesome, however, where a policy element does not include a protocol level manifestation. Also, in some cases, a single policy element could be present on more than one policy alternative. In such cases, it is not possible for the provider to accurately determine which alternative a client has picked. Accordingly, what is needed is a protocol that allows the various entities of a WS system to communicate the selected policy.

SUMMARY OF THE INVENTION

According to embodiments of the present invention, there is provided a system and method for policy negotiation in a web services platform. In an exemplary embodiment, an exemplary system may include a client node and a provider server that transmits policy alternatives to the client node. In an exemplary embodiment, the client node may select at least one policy from the policy alternatives and transmit the selected policy to the provider server. The provider server may then verify the client's policy selection based on the policy alternatives and communicate over a network with the node based on the selected policy.

An exemplary method of policy negotiation over a network, according to the present invention, may include transmitting a plurality of policy alternatives to a node, receiving a selection of at least one policy from the plurality of policy alternatives from the node, and verifying the selection of at least one policy based on the plurality of policy alternatives. In an exemplary embodiment, the method may further include communicating with the node based on the selection of at least one policy. In an exemplary embodiment, the verifying the selection of at least one policy may include comparing the selection of at least one policy to the plurality of policy alternatives to ensure that the selection of at least one policy is supported. In an exemplary embodiment, the method may further include storing the selection of at least one policy along with an ID associated with the node in a computer-readable medium.

In an exemplary embodiment, the network is a Web Services network and the node is a client. In an exemplary embodiment, the communication may include at least one or a SOAP message or an XML message and the plurality of policy alternatives may include at least one of a system capability, a system requirement, a quality of service, a security requirement, an encryption support, a transmission requirement, or a bulk data transfer requirement.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of preferred embodiments of the invention, as illustrated in the accompanying drawings, in which.

DETAILED DESCRIPTION OF THE EXEMPLARY EMBODIMENTS

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer).

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Embodiments of the present invention relate to a method and system for policy negotiation between various nodes of a communications system, such as, but not limited to, a WS system. Although the exemplary embodiments described herein may refer to a client and a provider as exemplary nodes of a WS system, it must be understood that the present invention may include any multi-node system. It must be further understood that policy negotiation, according to embodiments of the present invention, is not limited to a two-node negotiation and may be performed between three or more nodes of a system for multi-way communication.

According to embodiments of the present invention, a platform-independent policy negotiation protocol is defined to enable automatic policy negotiation between various nodes of a communications system, such as, but not limited to, a WS system. Unlike conventional WS policy protocols, in which the provider provides the client with a list of policy alternatives and the client picks one of the policies, embodiments of the present invention allow the client and the provider to negotiate on a policy or a list of policies, which they may then use for their communications. Accordingly, unlike conventional WS protocols in which the provider has no direct knowledge of the policy chosen by the client, in exemplary embodiments of the present invention, the provider may receive the selected policies from the client and verify the selected policies before the start of communication.

Figure 1:
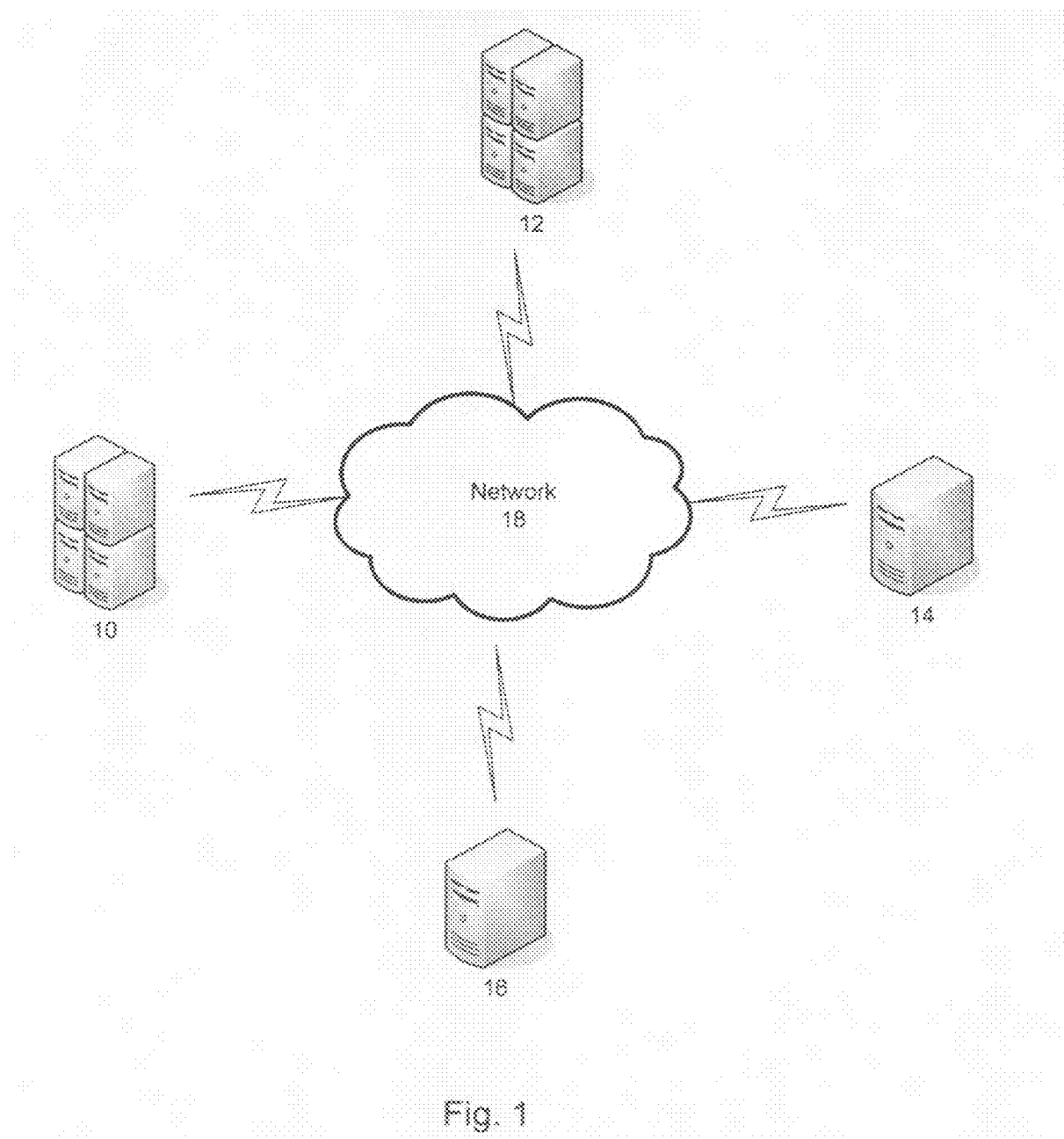
FIG. 1 depicts a block diagram of system according to an embodiment of the present invention.

FIG. 1 illustrates an exemplary system implementing an embodiment of the present invention. The system includes a number of nodes 10, 12, 14, 16 that may communicate with each other or other nodes via a network 18, which may be the Internet. In an exemplary embodiment, the nodes 10, 12 may be provider nodes and nodes 14, 16 may be client nodes. The provider nodes 10, 12 may provide a web service to the client nodes 14, 16 through a the network 18. The Web Services may use a protocol such as, for example, but not limited to, the SOAP, which, as previously described, is a protocol for exchanging XML-based messages over computer networks, normally using HTTP/HTTPS.

In an exemplary embodiment of the invention, in order for a provider node such as the provider node 10 and a client node such as the client node 14 to begin communicating, the provider node 10 may first assert a list of policy alternatives to the client node 14. The policy alternatives may be, for example, presented in an XML document listing all the policy alternatives. Once the client node 14 receives the policy alternatives, the client may then choose one or more policies from the policy alternatives and communicate those choices back to the provider node 10. The provider node 10 may then receive these choices from the client node 14 and verify that the policies selected by the client node 14 are in fact from the asserted policy alternatives. The provider node 10 and the client node 14 may then exchange measures according to the agreed upon policy.

Figure 2:
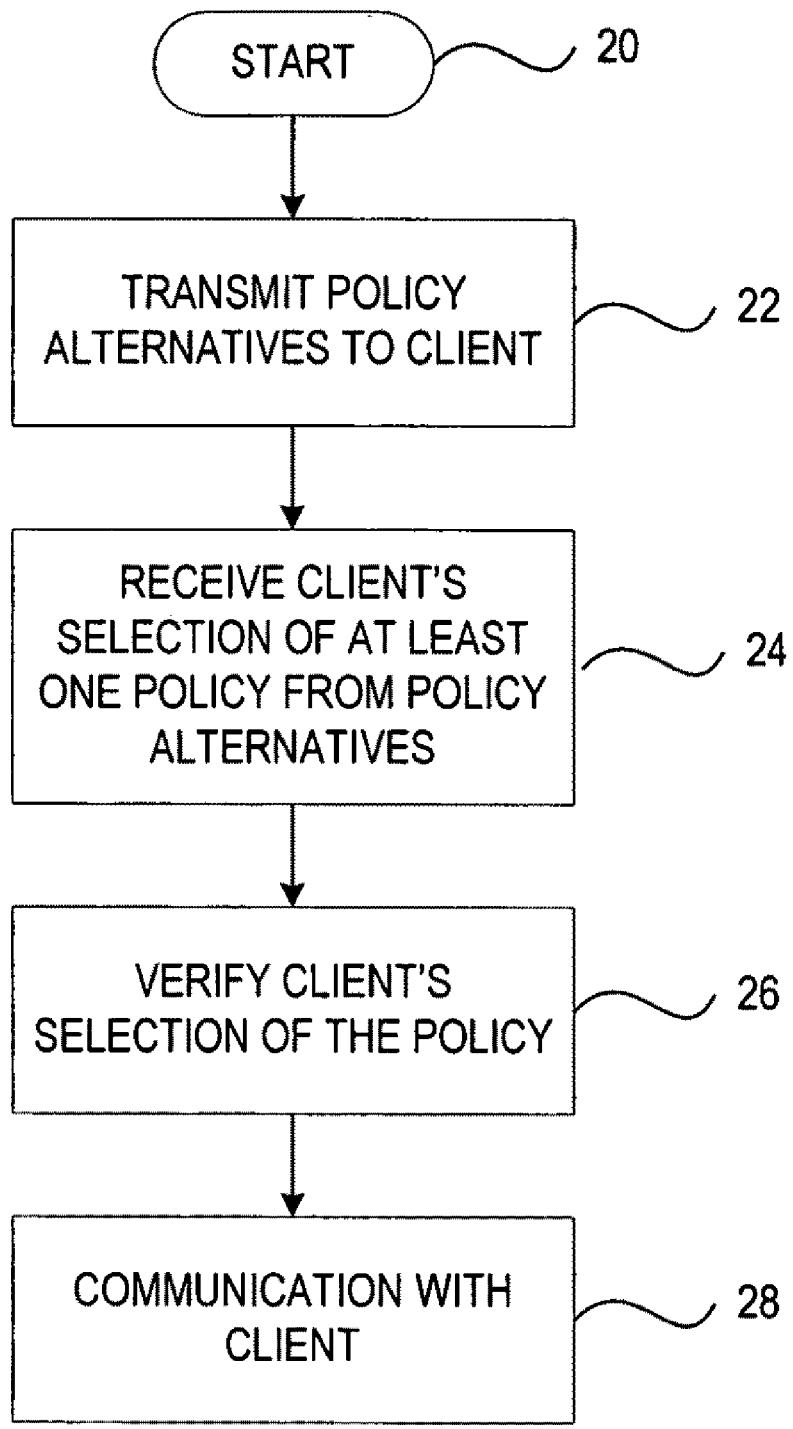
FIG. 2 illustrates an exemplary method for policy negotiation according to an embodiment of the present invention.

FIG. 2 illustrates an exemplary method for policy negotiation according to an embodiment of the present invention. As depicted in FIG. 2, a provider side such as a WS provider may start policy negotiation with a client side, block 20. Policy negotiations, according to an exemplary embodiment of the invention, may be WS-Policy negotiation. The provider side may transmit policy alternatives to the client, block 22. The policy alternatives may be in the form of an XML document. After the client side receives the policy alternatives, the client may choose one or more of the policy alternatives. For example, the provider side may provide the client side with multiple choices for an encryption policy as policy alternatives, and the client side may choose one or more of those policy alternatives. Conventionally, after the client picks a policy from the policy alternatives, the provider is not notified of the client's choice and, therefore, in some circumstances, is not able to determine client's policy choice after the commencement of communication with the client. For example, the provider may know that the messages from the client are encrypted, but does not readily know which encryption policy the client has chosen. According to embodiments of the present invention, however, after the client picks one or more policies from the policy alternative, the client may then transmit those choices back to the provider side, block 24. The client's transmission of policy choices may also be in the form of an XML document. After the provider side receives the client's choice of policy or policies, the provider may then verify such choices, block 26. Thereafter, the provider side may communicate with the client using the selected policy or policies, block 28.

In an exemplary embodiment, there may be several policy elements for which the provider may wish to establish a policies with a client. For example, the provider may wish to establish policies for policy elements such as the transmission rate, the encryption protocol, the security protocol, etc. Some of these policy elements may have a corresponding protocol level manifestation, which the provider can use to determine the policy alternative chosen by the client. For example, if the policy element is the transmission rate, the provider can readily determine the policy alternative chosen by the client by sampling the transmission rate of the messages sent from the client. However, for policy elements such as the encryption or security protocols, the provider may not be able to determine the policy alternative chosen by the client by simply examining the messages coming from the client. Further, some policy elements may be present on more than one policy alternative. For example, the provider may assert a set of policy alternatives for "security policy" and another set of policy alternatives for "secure conversation", which is a subset of security policy. Since these two policy elements may have policy alternatives in common, even if the provider can determine the policy alternative chosen by the client from the protocol-level manifestation of the policy, it may be difficult for the provider to determine which of the policy elements that policy alternative is intended for. Thus, in an exemplary embodiment, the provider may initiate a policy negotiation with the client if the policy alternative can not be determined based on a protocol level manifestation of the policy alternative.

Figure 3:
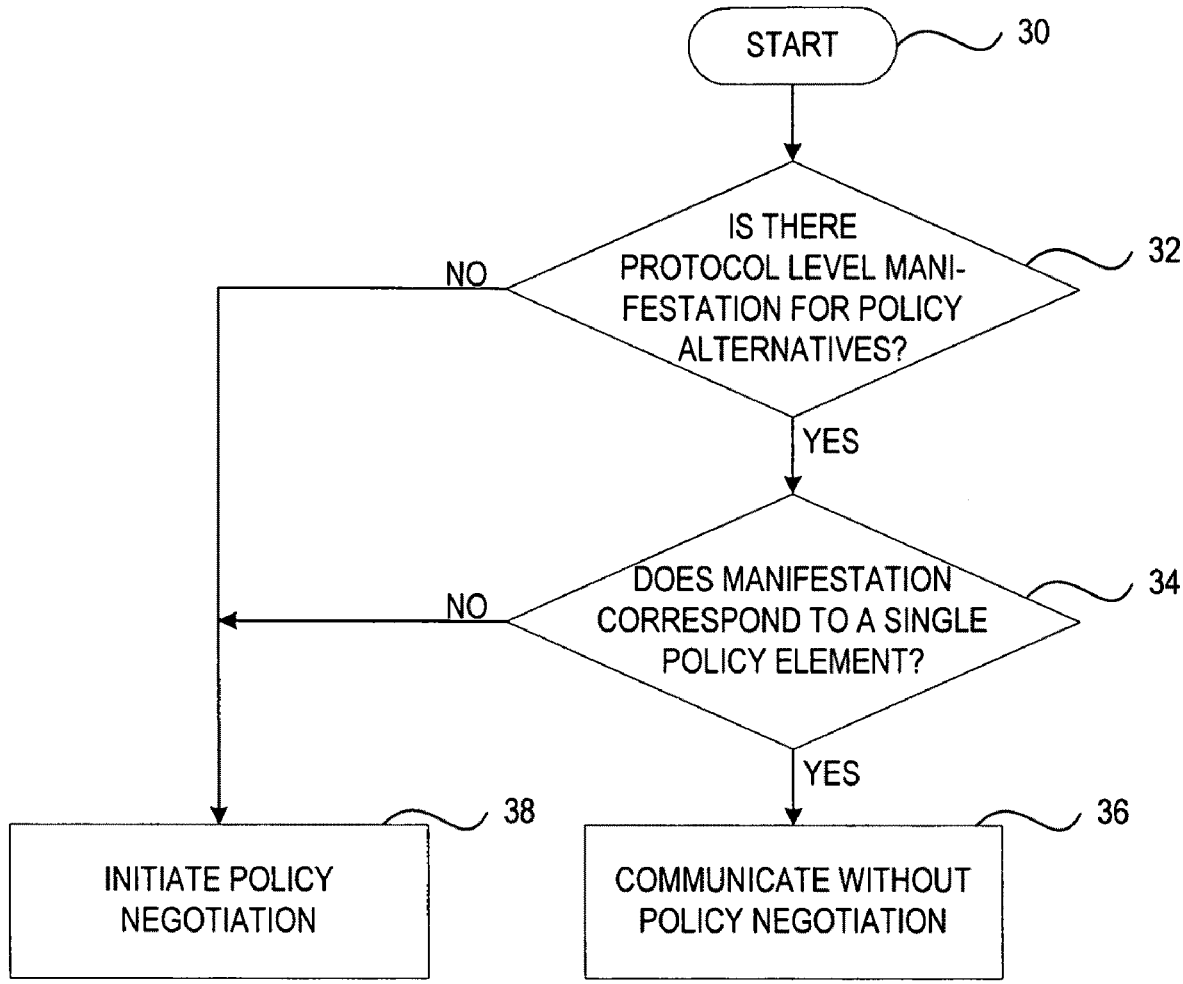
FIG. 3 illustrates an exemplary method for determining whether policy negotiation is needed, according to an exemplary embodiment of the invention.

FIG. 3 illustrates an exemplary method for determining whether policy negotiation is needed, according to an exemplary embodiment of the invention. In an exemplary embodiment, before initiating policy negotiation with a client, a provider may first determine whether such policy negotiation is needed, block 30. The provider may determine whether there are any protocol-level manifestations for the policy alternatives that it intends to assert on the client, block 32. The provider may also determine if any such protocol-level manifestation correspond to a single policy element, such that detecting such manifestation would allow the provider to determine which policy element the selected policy belongs to, block 34. If both these determinations are positive, the provider may continue to communicate with the client without a need for policy negotiation, block 36. Otherwise the provider may initiate policy negotiation with the client, block 38.

In an alternative or additional embodiment of the invention, the determination of whether policy negotiation is needed may rest with the client. Thus, the client may receive a set of policy alternatives for one or more policy elements from a provider and determine whether the policy alternative it intends to select can be manifested at the protocol-level and/or whether such manifestation would correspond to a single policy element. Thereafter, the client only transmit these policy choices that cannot be readily manifested through regular communication with the provider.

Figure 4:
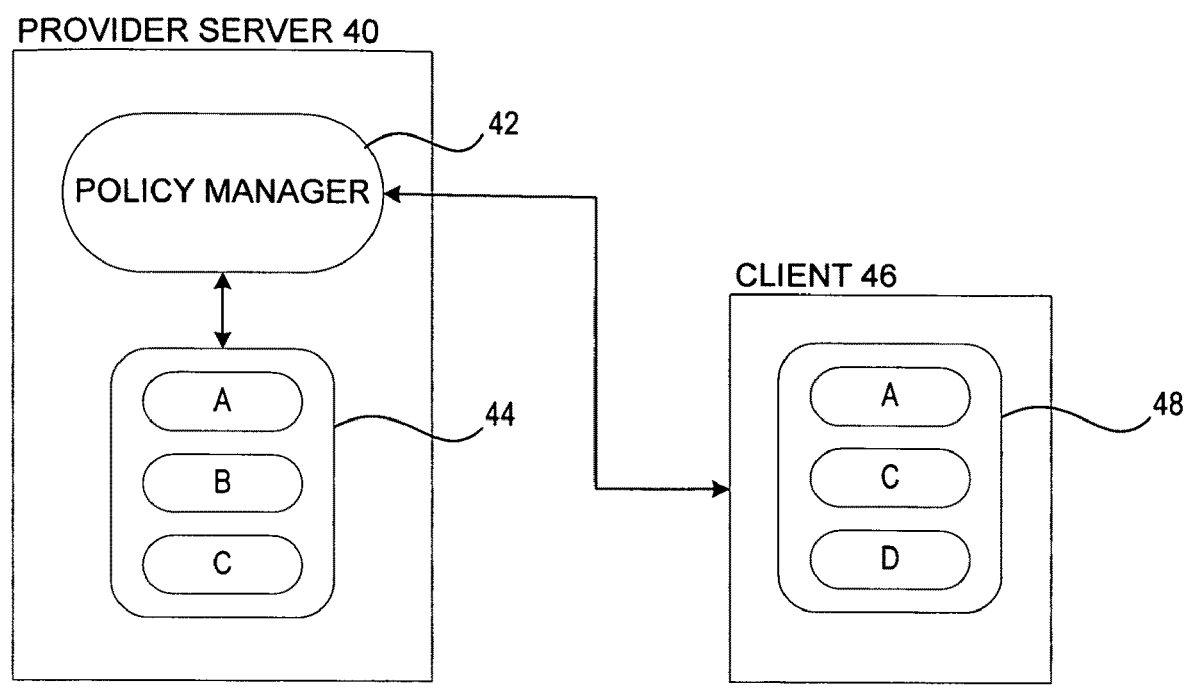
FIG. 4 illustrates an exemplary policy negotiation system block diagram including exemplary provider/client policy, according to an embodiment of the present invention.

FIG. 4 illustrates an exemplary policy negotiation system block diagram including exemplary provider/client policies, according to an embodiment of the present invention. As shown in FIG. 4, a provider server 40 may include a policy manager 42, which may be a software module for managing the provider's policy alternatives, providing the policy alternatives to a client 46, and receiving the client's 46 selection of policy. In the depicted example, the provider server 40 may include a policy list 44 of three policies, A, B, and C, which may be, for example, data encryption policies that the provider server 40 can support. The client 46 may be able to support three encryption policies A, C, and D, listed in the policy list 48. After the policy manager 42 sends the policy alternatives to the client 46, the client 46 may choose, for example, policy A, policy C, or both, and transmit the policies chosen to the policy manager 42. The provider server 40 may then verify that the chosen policy or policies are in fact from the list of policy alternatives, after which the provider server 40 may start communication with the client 46.

According to an exemplary embodiment of the invention, the negotiated policy agreed upon by the client and the provider may be captured and stored as record of the provider and/or the client having understood the policy. In an exemplary embodiment, the agreed-upon policy may also be used to bind the provider and/or the client to use the terms of the policy. This may be particularly useful where the parties' commitment to understand and conform to the policy is critical.

According to an exemplary embodiment of the invention, if the client 46 chooses more than one policy, e.g., the client 46 chooses both policy A and policy C, the client 46 may in effect give the option of selecting the policy back to the provider server 40. For example, if the client 46 wishes to inform the provider server 40 that it has both policies A and C available, but is indifferent as to which of the two policies are used for communication, it may opt to select both policies A and C. In that case, the provider server 40 may then elect one of the chosen policies and begin communication with the client 46. Additionally, the provider server 40 may send a further message to the client 46, informing the client 46 of the policy that was elected before starting the communication.

Figure 5:
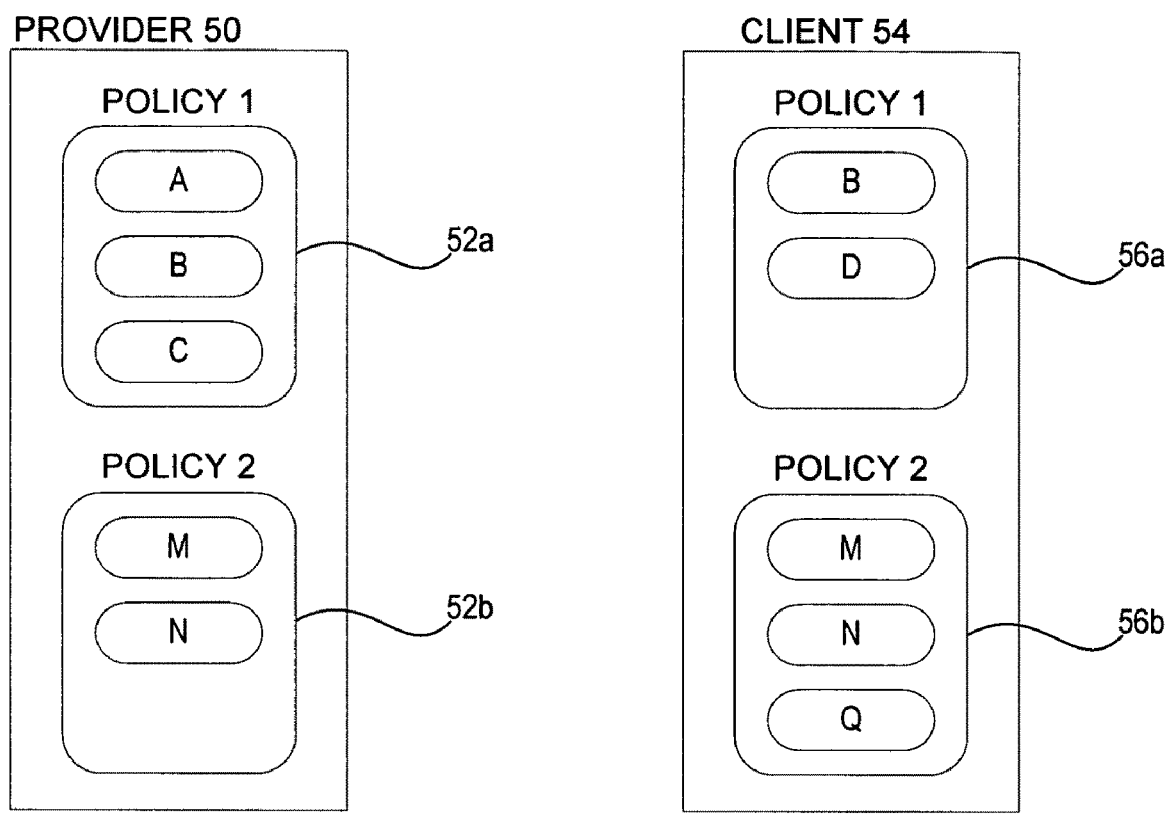
FIG. 5 illustrates an exemplary policy negotiation system block diagram including exemplary provider/client policies having multiple policy elements, according to an embodiment of the present invention.

FIG. 5 illustrates an exemplary policy negotiation system block diagram including exemplary provider/client policies having multiple policy elements, according to an embodiment of the present invention. In this embodiment, a provider may assert a set of policy alternatives for each policy element. For example, the provider may want to establish two policy elements—encryption protocol and transmission rate. Thus, the provider may asset a first set of policy alternatives for encryption protocol and a second set of policy alternatives for transmission rate. In the depicted example, a provider 50 may asset a policy list 52a for a first policy element and a policy list 52b for a second policy element. The first policy element, for example, may be related to data encryption policies, whereas the second policy element may be related to transmission rate. In the depicted example, the policy list 52a may include policies A, B and C and the policy list 52b may include policies M and N.

After the client 54 receives the policy lists 52a, 52b from the provider 50, the client 54 may then compare the policy lists 52a, 52b to its own available policy lists 56a, 56b, respectively. In the depicted example, the client may then choose policy B from the policy list 52a for the first policy element, because policy B is the only policy in the policy list 52a that the client 54 can support. As for the second policy element, however, the client 54 may choose, for example, policy M, policy N, or both, because it can support both policies M and N in the policy list 56b. The client 54 may then communicate which policies were chosen for each policy element to the provider 50, which may then verify the chosen policies for each policy element and start the communication.

According to an embodiment of the invention, a provider may store a policy negotiated with a client along with an ID associated with that client in a computer-readable medium such as a database of client IDs and policies associated with those client. The client ID may include, but is not limited to, an IP address associated with the client. At a later time, when the provider is initiating a new communication with a client, the provider may query the database for that client's ID to determine whether the provider has already negotiated a policy with that client. For example, if the provider is starting communication with a client and needs to establish encryption policy with that client, the provider may search the database in order to determine if the provider and the client have negotiated an encryption policy in the past. If so, the provider may start communicating with the client using the stored policy without a need to negotiate a new policy with the client. In an exemplary embodiment, each policy stored in the database may have an expiration date, such that a provider does not start a communication with a client using out-dated policies. Alternatively, the provider may determine whether to re-negotiate policy with the client based on various factors, e.g., but not limited to, the type of policy, frequency of communication with the client, receipt of an error message or a request for negotiation from the client, etc.

In an alternative or additional exemplary embodiment, the client may store policies negotiated with the provider for future communication with the provider. In an exemplary embodiment, the already negotiated policies may also be used by the client for communicating with different processes on the provider side.

An exemplary application of the present invention is in conjunction with the system and method of concurrently file U.S. patent application entitled "System, Method and Computer Program Product for Generating Bulk Data Transfer", of a common inventor as the present application, which discloses a protocol for bundling multiple messages that have a common destination into a single message, which is then transferred to that destination. The messages may be, e.g., but not limited to, SOAP messages sent within a WS system. The combining of the messages into a single message may be done at a predetermined time, such as every second, or may be done upon occurrence of an event, such as when a particular number of messages to be sent to the same destination node is accumulated. At that time, the messages may be examined to identify those messages intended for the same destination. Those messages intended for that destination may be combined into a single message and transmitted to that destination. Alternatively, the messages intended for the same destination may be identified and stored, for example, in a log. When a predetermined number of messages is present in the log, the messages may be appropriately combined and transmitted to their respective destinations.

In an exemplary embodiment of the invention, the provider and the client may negotiate on policies relating to bulk data transfer before the data transfer is initiated. For example, the provider and the client may negotiate on a timing policy to determine time intervals at which the messages going to the same destination are combined. Also, the provider and the client may negotiate on policies relating to whether the messages are stored in a log, the number of messages that need to be present in the log before they are combined, etc.

Exemplary policy negotiation protocol extensions are discussed herein. In an exemplary embodiment, policy negotiation protocols of the present invention may be used with, for example, but not limited to, Web Services Description Language (WSDL), which is an XML-based language that provides a model for describing web services and is often used in conjunction with SOAP. An example of a policy attached to a WSDL message according to the conventional WS-Policy specification is as follows:

```
(01)   <wsdl20:description>
(02)   ...
(03)      <wsp:Policy wsu:Id="common">
(04)         <mtom:OptimizedMimeSerialization wsp:Optional="true"/>
(05)         <wsam:Addressing>...</wsam:Addressing>
(06)      </wsp:Policy>
(07)      <wsp:Policy wsu:Id="secure">
(08)         <wsp:ExactlyOne>
(09)            <sp:TransportBinding>...</sp:TransportBinding>
(10)            <sp:AsymmetricBinding>...</sp:AsymmetricBinding >
(11)         </wsp:ExactlyOne>
(12)      </wsp:Policy>
(13)      <wsdl20:service name="RealTimeDataService"
(14)             interface="tns:RealTimeDataInterface" >
(15)         <wsdl20:endpoint name="RealTimeDataPort"
(16)                binding="tns:SecureBinding">
(17)            <wsp:PolicyReference URI="#common" />
(18)            ...
(19)         </wsdl20:endpoint>
(20)      </wsdl20:service>
(21)   ...
(22)   </wsdl20:description>
```

In an exemplary embodiment, a provider may indicate that policy negotiation is available via a WSDL extension as follows:

```
(01)   <wsdl20:description>
(02)   ...
(03)      <wsp:Policy wsu:Id="common">
(04)         <mtom:OptimizedMimeSerialization wsp:Optional="true"/>
(05)         <wsam:Addressing>...</wsam:Addressing>
(06)      </wsp:Policy>
(07)      <wsp:Policy wsu:Id="secure">
(08)         <wsp:ExactlyOne>
(09)            <sp:TransportBinding>...</sp:TransportBinding>
(10)            <sp:AsymmetricBinding>...</sp:AsymmetricBinding >
(11)         </wsp:ExactlyOne>
(12)      </wsp:Policy>
(13)      <wsdl20:service name="RealTimeDataService"
(14)             interface="tns:RealTimeDataInterface" >
(15)         <wsdl20:endpoint name="RealTimeDataPort"
(16)                binding="tns:SecureBinding">
(17)            <wsp:PolicyReference URI="#common" />
(18)            ...
(19)            <wspn:Negotiation="true"
                  xmlns:wspn=
                  "http://www.softwareAG.com/policyNegotiation" \>
(20)         <wsdl20:endpoint>
(21)      </wsdl20:service>
(22)   ...
(23)   </wsdl20:description>
```

An example of the policy including available alternatives provided by the provider. This policy calls for the client to pick one of the two "Security" policy alternatives and one of the two "Transport Binding" policy alternatives, for example:

```
<wsp:Policy
   xmlns:sp="http://docs.oasis-open.org/ws-sx/ws-securitypolicy/200702"
   xmlns:wsp="http://www.w3.org/ns/ws-policy" >
   <wsp:All>
      <wsp:ExactlyOne>              ← Security Policy Alternatives
         <wsp:All>
            <sp:SignedParts>        ← Alternative 1 - Signed Parts (Security-1)
               <sp:Body/>
            </sp:SignedParts>
         </wsp:All>
         <wsp:All>                  ← Alternative 2 - Encrypted Parts (Security-2)
            <sp:EncryptedParts>
               <sp:Body/>
            </sp:EncryptedParts>
         </wsp:All>
      </wsp:ExactlyOne>
      <wsp:ExactlyOne>              ← Transport Policy Alternatives
      <wsp:All>
```

```
          <sp:TransportPolicy>          ← Transport Policy Alternative 1 (Transport-1)
            <wsp:Policy>
              <sp:AlgorithmSuite>
                <wsp:Policy>
                  <sp:Basic256Rsa15 />
                </wsp:Policy>
              </sp:AlgorithmSuite>
              <sp:TransportToken>
                <wsp:Policy>
                  <sp:HttpsToken>
                    <wsp:Policy/>
                  </sp:HttpsToken>
                </wsp:Policy>
              </sp:TransportToken>
            </wsp:Policy>
          </sp:TransportPolicy>
        </wsp:All>
        <wsp:All>                       ← Transport Policy Alternative 1 (Transport-2)
          <sp:TransportPolicy>
            <wsp:Policy>
              <sp:AlgorithmSuite>
                <wsp:Policy>
                  <sp:TripleDesRsa15 />
                </wsp:Policy>
              </sp:AlgorithmSuite>
              <sp:TransportToken>
                <wsp:Policy>
                  <sp:HttpsToken>
                    <wsp:Policy/>
                  </sp:HttpsToken>
                </wsp:Policy>
              </sp:TransportToken>
            </wsp:Policy>
          </sp:TransportPolicy>
        </wsp:All>
      </wsp:ExactlyOne>
    </wsp:All>
  </wsp:Policy>
```

According to this policy, the client needs to pick exactly one of each of the two alternatives in both Policy Alternatives, i.e., one of the two Security policies and one of the two Transport policies. These choices are identified as (Security-1) and (Security-2) and (Transport-1) and (Transport-2) in the listing above. Assuming that the client chooses Security-1 (Signed Parts) and Transport-1 (Transport Policy 1), the client's picks may be embodied in a message as follows:

```
<wsp:Policy
    xmlns:sp="http://docs.oasis-open.org/ws-sx/ws-securitypolicy/200702"
    xmlns:wsp="http://www.w3.org/ns/ws-policy" >
  <wsp:All>
    <wsp:All>                           ← Alternative 1 - Signed Parts (Security-1)
      <sp:SignedParts>
        <sp:Body/>
      </sp:SignedParts>
    </wsp:All>
    <wsp:All>
      <sp:TransportPolicy>              ← Transport Policy Alternative 1 (Transport-1)
        <wsp:Policy>
          <sp:AlgorithmSuite>
            <wsp:Policy>
              <sp:Basic256Rsa15 />
            </wsp:Policy>
          </sp:AlgorithmSuite>
          <sp:TransportToken>
            <wsp:Policy>
              <sp:HttpsToken>
                <wsp:Policy/>
              </sp:HttpsToken>
            </wsp:Policy>
          </sp:TransportToken>
        </sp:TransportPolicy>
      </wsp:All>
    </wsp:All>
</wsp:Policy>
```

The embodiments illustrated and discussed in this specification are intended only to teach those skilled in the art the best way known to the inventors to make and use the invention. The above-described embodiments of the invention may be modified or varied, and elements added or omitted, without departing from the invention, as appreciated by those skilled in the art in light of the above teachings. For example, the order in which the steps are performed may be varied as long as the above-described dependencies are maintained. It is therefore to be understood that, within the scope of the claims and their equivalents, the invention may be practiced otherwise than as specifically described.

What is claimed is:

1. A method of policy negotiation over a network comprising:
   determining with a computer whether at least one of a plurality of policy alternatives includes a corresponding protocol-level manifestation;
   transmitting the plurality of policy alternatives to a node if the policy alternative does not include the corresponding protocol-level manifestation;
   receiving a selection of at least one policy from policy alternatives from the node to identify a selected policy to be used for communicating with node; and
   verifying with the computer the selected policy based on the plurality of policy alternatives before communicating with the node using the selected policy.

2. The method of claim 1, further comprising:
   communicating with the node based on the selection of at least one policy.

3. The method of claim 1, wherein the network is a Web Services network and the node is a client.

4. The method of claim 3, wherein the communication comprises at least one of a SOAP message or an XML message.

5. The method of claim 1, wherein the plurality of policy alternatives comprises at least one of a system capability, a system requirement, a quality of service, a security requirement, an encryption support, a transmission requirement, or a bulk data transfer requirement.

6. The method of claim 1, wherein the verifying the selection of at least one policy comprises:
   comparing the selection of at least one policy to the plurality of policy alternatives to ensure that the selection of at least one policy is supported.

7. The method of claim 1, further comprising storing the selection of at least one policy along with an ID associated with the node in a computer-readable medium.

8. The method of claim 7, further comprising:
   initiating a second communication with the node based on the selection of at least one policy, wherein the initiating a second communication comprises determining whether the second communication includes a destination corresponding to the node based on the ID.

9. The method of claim 1, wherein the plurality of policy alternatives are related to a first policy element, further comprising:
   transmitting a second plurality of policy alternatives to the node, wherein the second plurality of policy alternatives are related to a second policy element.

10. The method of claim 1, wherein the selection of at least one policy includes two or more policies, further comprising:
    electing one of the two or more policies; and
    initiating a communication with the node based on the elected policy.

11. The method of claim 1, further comprising:
    determining whether the protocol-level manifestation is unique to the at least one of said plurality of policy alternatives; and
    proceeding with the transmitting step if the protocol-level manifestation is not unique to the at least one of said plurality of policy alternatives.

12. A method of policy negotiation over a network comprising:
    receiving a plurality of policy alternatives from a node;
    selecting at least one policy from the plurality of policy alternatives;
    determining whether the selection of the at least one of the plurality of policy alternatives includes a corresponding protocol-level manifestation and the protocol-level manifestation is unique to the at least one of said plurality of policy alternatives;
    transmitting the selection of at least one policy to the node before communicating with the node utilizing the selection of at least one policy if the selection of the at least one of the plurality of policy alternatives does not include a corresponding protocol-level manifestation and the protocol-level manifestation is not unique to the at least one of said plurality of policy alternatives; and
    receiving a communication from the node, wherein the communication is based on the selection of at least one policy.

13. The method of claim 12, wherein the network is a Web Services network and the node is a provider.

14. The method of claim 12, wherein the selecting at least one policy comprises:
    comparing the plurality of policy alternatives with a list of available policies; and
    choosing at least one policy in common between the plurality of policy alternatives and the list of available policies.

15. A non-transitory computer readable medium storing computer readable program code for causing a computer to perform the steps of:
    determining whether at least one of a plurality of policy alternatives includes a corresponding protocol-level manifestation;
    transmitting the plurality of policy alternatives to a node if the policy alternative does not include a corresponding protocol-level manifestation;
    receiving a selection of at least one policy from policy alternatives from the node to identify a selected policy to be used for communicating with node; and
    verifying the selected policy based on the plurality of policy alternatives before communicating with the node using the selected policy.

16. A non-transitory computer readable medium storing computer readable program code for causing a computer to perform the steps of:
    receiving a plurality of policy alternatives from a node;
    selecting at least one policy from the plurality of policy alternatives;
    determining whether the selection of the at least one of the plurality of policy alternatives includes a corresponding protocol-level manifestation and the protocol-level manifestation is unique to the at least one of said plurality of policy alternatives;

transmitting the selection of at least one policy to the node before communicating with the node utilizing the selection of at least one policy if the selection of the at least one of the plurality of policy alternatives does not include a corresponding protocol-level manifestation and the protocol-level manifestation is not unique to the at least one of said plurality of policy alternatives; and receiving a communication from the node, wherein the communication is based on the selection of at least one policy.

* * * * *

UNITED STATES PATENT AND TRADEMARK OFFICE
CERTIFICATE OF CORRECTION

PATENT NO. : 8,005,967 B2  Page 1 of 1
APPLICATION NO. : 12/073647
DATED : August 23, 2011
INVENTOR(S) : Prasad Yendluri It is certified that error appears in the above-identified patent and that said Letters Patent is hereby corrected as shown below:

At column 3, line number 66, change "through a the network" to --through the network--.

Signed and Sealed this
Eighth Day of November, 2011

David J. Kappos
*Director of the United States Patent and Trademark Office*